US007294290B2

(12) United States Patent
Srinivasa

(10) Patent No.: US 7,294,290 B2
(45) Date of Patent: Nov. 13, 2007

(54) PHOTOCHROMIC COMPOSITION IN A SOLID MATRIX

(75) Inventor: Ramanujan Srinivasa, Monroeville, PA (US)

(73) Assignee: NGX, Inc., Phoenixville, PA (US)

( * ) Notice: Subject to any disclaimer, the term of this patent is extended or adjusted under 35 U.S.C. 154(b) by 0 days.

(21) Appl. No.: 10/870,833

(22) Filed: Jun. 17, 2004

(65) Prior Publication Data

US 2005/0026072 A1 Feb. 3, 2005

Related U.S. Application Data

(60) Provisional application No. 60/492,077, filed on Aug. 1, 2003.

(51) Int. Cl.
*F21V 9/08* (2006.01)
*G02B 5/23* (2006.01)
*C09B 67/00* (2006.01)

(52) U.S. Cl. ............................. 252/586; 8/603; 8/657; 252/582; 558/303; 558/411; 558/418; 558/421

(58) Field of Classification Search ................. 252/582
See application file for complete search history.

(56) References Cited

U.S. PATENT DOCUMENTS 4,743,531 A 5/1988 Farid et al.
4,880,667 A * 11/1989 Welch ........................ 427/160
4,994,208 A 2/1991 McBain et al.
5,061,592 A 10/1991 Imai et al.
5,084,529 A 1/1992 Crano
5,246,630 A 9/1993 Selvig
5,405,958 A 4/1995 Van Gemert
5,498,686 A 3/1996 Effer et al.
6,083,427 A 7/2000 Henry
6,107,395 A 8/2000 Rosthauser et al.
6,561,616 B1 * 5/2003 Hawkins et al. .............. 347/20
6,733,887 B2 5/2004 Okoroafer et al.

FOREIGN PATENT DOCUMENTS

EP 294056 4/1994

* cited by examiner

*Primary Examiner*—Randy Gulakowski
*Assistant Examiner*—Timothy J. Kugel

(57) ABSTRACT

The invention relates to novel photochromic composition for controlling the transmission of light comprising an organic polymer, photochromic dye, photosensitizer and an electron acceptor. The invention also includes a method for preparing photochromic films.

2 Claims, 2 Drawing Sheets

PHOTOCHROMIC COMPOSITION IN A SOLID MATRIX

CROSS REFERENCE TO RELATED APPLICATION

This is a nonprovisional application claiming priority benefit of provisional application No. 60/492,077, filed Aug. 1, 2003, entitled, "Method of Integrating A Photochromic Compound into a Solid Matrix".

BACKGROUND OF INVENTION

1. Field of Invention

The present invention relates to solid photochromic polymers including coatings, free-standing films, and solid articles that exhibit variable transmission of light upon exposure to ultraviolet radiation. The photochromic polymers are useful for controlling the transmission of light in building and automobile windows, sunroofs, ophthalmic plastic lenses, and any surface that would benefit from variable transparency in direct sunlight.

2. Background of the Art

Polymer articles that have organic photochromic dye(s) applied or incorporated therein are characterized in that upon exposure to electromagnetic radiation, e.g., solar radiation, they exhibit a reversible change in color and light transmission. Once the exposure to the activating radiation has been discontinued, the composition returns to its original color, or colorless state. Photochromic plastic materials, most notably, such as compositions suitable for variable transparency in direct sunlight, have applications in many architecture, building, and automotive glazing applications, as well as for ophthalmic lenses and other solid objects. A general and informative review of photochromic organic materials is presented in "Photochromism, Molecules and Systems" by H. Dürr and H. Bouas-Laurent, eds., Elsevier, Amsterdam, (2003).

A wide variety of polymer materials have been investigated as host materials for photochromic dyes systems. Diallyldigylcolcarbonates (e.g. CR-39, from PPG Industries) and related polyol(allylcarbonate) systems are described in U.S. Pat. No. 5,246,630, and references cited therein for use with photochromic dyes. The systems require either a photochromic dye which is resistant to the effects of peroxy type initiator or a secondary processing step in which the photochromic dye is "imbibed" or carried into the polymer by solvent/thermal transfer. U.S. Pat. No. 4,994,208, McBain, et al., describes compositions that comprise a mixture of minor amounts of a acrylate capped polyurethane and a major amount of the polyol(allylcarbonate) composition that improves the equilibrium response of the photochromic dyes compared to photochromic articles prepared from homopolymers such as diethyleneglycol bis(allylcarbonate). The systems tend to undergo yellowing with heat ageing and thermal transfer. However, U.S. Pat. No. 5,084,529 and the earlier cited '630 describe the use of small amounts of pyrocarbonate and triphenyl phosphite, respectively, to circumvent the heat related yellowing problem.

Photochromic polyurethanes are described in EU 0294056, Ormsby, and later in U.S. Pat. No. 6,107,395, Rosthauser, et al., The significant benefit of the polyurethane polymer matrix is that photochromic dyes are typically stable to the cure or hardening process. The '395 patent also represents the polyurethane-photochromic dye system to have superior coloring and fading rates. U.S. Pat. No. 5,498,686, Effer, et al., describe a polythiourethane matrix derived from polymerization of diisocyanate with a polymercapto compound, that has improved photostability and thus improved cycle and service life over the conventional materials based on diethylene glycol bisallyl carbonate systems.

Many other polymers have been used to make photochromic articles, but for most applications that require sunlight and thermal stability, they have been found to be lacking. The critical response requirements of a photochromic polymer system include: photo-activation (coloring: quantum yield and intensity), fading (rate of bleaching in absence of light), and thermal and photostability in terms of life cycle. There are also other performance issues such as transparency and dispersion, impact resistance and scratch resistance that are highly dependent upon the specific polymer matrix chosen to hold the photochromic dye.

Surprisingly, the inventor has found that addition of a small amount of a specific class of material to a photochromic polymer system can significantly improve the photo-activation and fading response of a given photochromic system. That class of material is commonly referred to as an electron acceptor. However, the invention is not defined or limited by what the mechanism of action may or may not be.

SUMMARY OF INVENTION

The invention is a photochromic composition for controlling the transmission of light comprising an organic polymer, a photochromic dye, a photosensitizer, and an electron acceptor. In one embodiment the photochromic composition comprises an organic polymer of the structure:

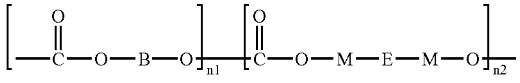

wherein B is:

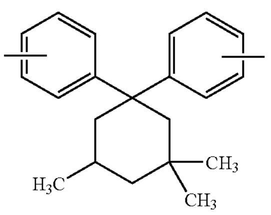

M is:

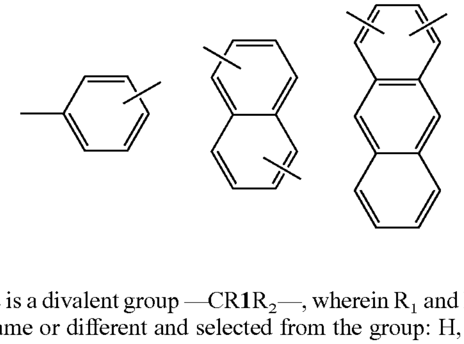

and E is a divalent group $-CR1R_2-$, wherein $R_1$ and $R_2$ are the same or different and selected from the group: H, alkyl, arylalkyl, and spirofluorenyl; and n1+n2=100 to about 1000; photochromic dyes of the spiroindoline structures III and IIIa:

III

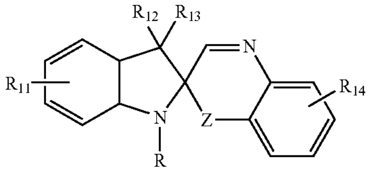

IIIa

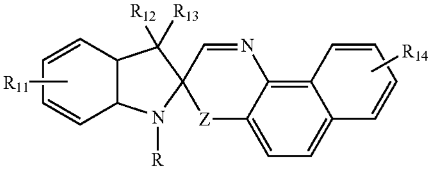

wherein R is selected from the group of $C_1$-$C_{10}$ straight chain and branched chain hydrocarbon; $R_{11}$ is selected from the group: hydrogen, $C_1$-$C_{18}$ alkyl, aryl, arylalkyl, alkylaryl, and alkylarylalkyl groups; $R_{12}$ and $R_{13}$ are the same or different and are selected from the group: hydrogen, $C_1$-$C_{18}$ alkyl, aryl, arylalkyl, alkylaryl, and alkylarylalkyl, spirofluorenyl- groups; $R_{14}$ is selected from the group: hydrogen, $C_1$-$C_{18}$ alkyl, aryl, arylalkyl, alkylaryl, alkylarylalkyl, benzo-, naptho-, and phenanthro- groups; Z is sulfur or oxygen; and each of $R_{11}$ $R_{12}$, $R_{13}$ and $R_{14}$ may be interrupted or uninterrupted by one oxygen, and substituted or unsubstituted by one or two moieties selected from the group HO—, R'O—, Cl, Br, F, —CN, —$NO_2$, and R'$SO_3$—, wherein R'is selected from the group of $C_1$-$C_{10}$ straight chain and branched chain, alicyclic, aryl, and alkylaryl hydrocarbons; an electron acceptor selected from the group: pyridinium salts, viologens, arylpyrilium salts, nitro and dinitro aromatic compounds, cyano and polycyano aromatic compounds; and a photo sensitizer.

Another embodiment of the invention is a method of preparing a solid plastic photochromic film comprising mixing and stirring an organic polymer, a photochromic dye, a photosensitizer, and an electron acceptor in an organic solvent to provide a homogeneous gel mixture; coating the gel on a substrate to provide a wet film; and curing the film to provide a solid plastic photohromic film. The films may be used on the substrate or removed to provide free-standing photochromic films.

DETAILED DESCRIPTION OF INVENTION

Figure 1:
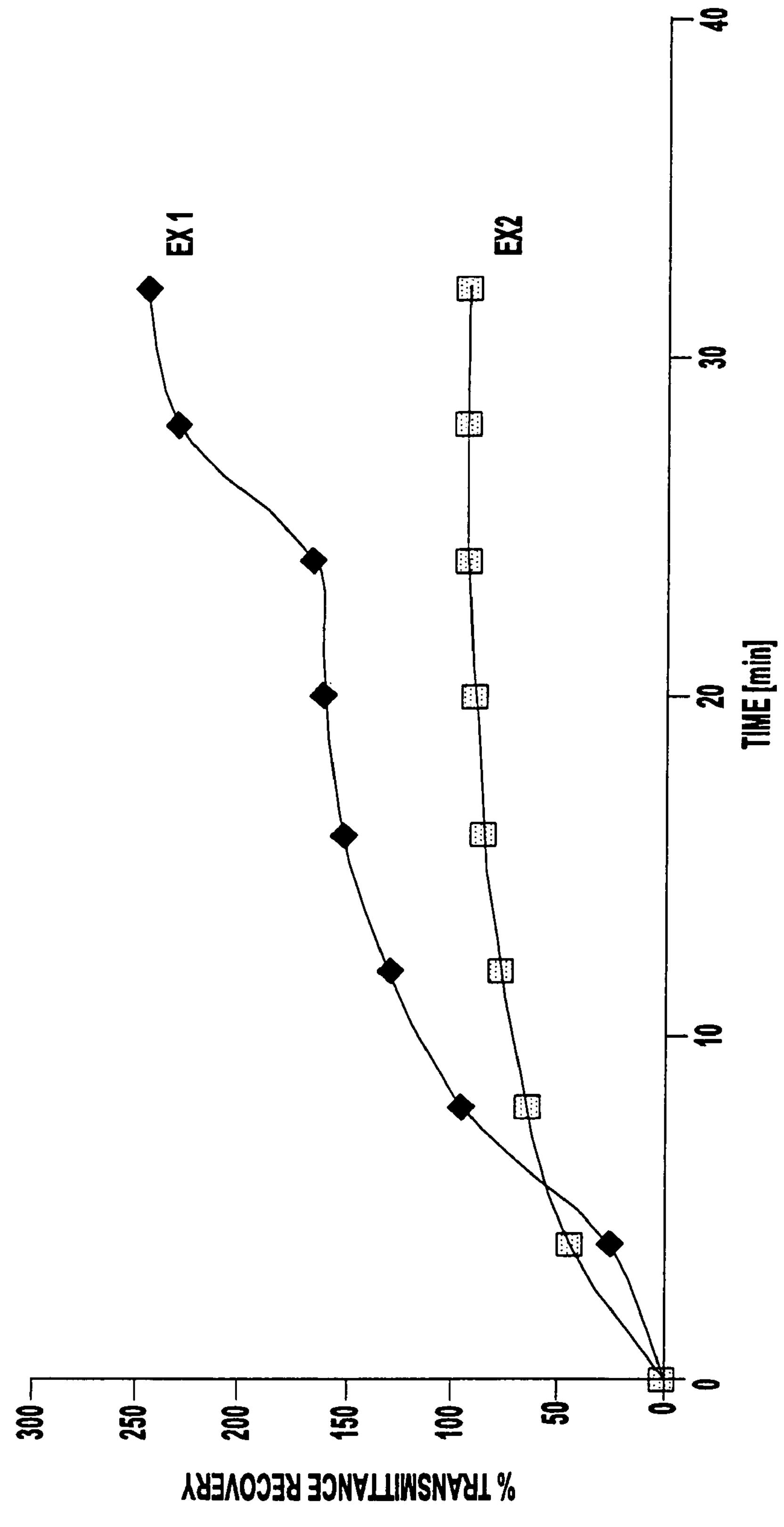
FIG. 1 shows the % transmittance recovery with time during the fading cycle.

The present invention relates to a process that provides a plastic photochromic composition for controlling the transmission of light which has superior performance characteristics in terms of desired properties such as transparency, high optical density when activated, rapid increase in coloration, and rapid decrease in coloration (fading) upon termination of activation.

The photochromic composition of the invention comprises an organic polymer, a photochromic dye, a photosensitizer, and an electron acceptor.

By "organic polymer" we mean polymers of both the thermoplastic and thermosetting type that have carbon and hydrogen atoms making up the majority of atoms in the repeat unit. Thermoplastic polymers preferred for the invention are those having a solubility of at least 2 wt %, and preferably 5 wt % or more, in an organic solvent. Specific classes of polymers useful in the invention are addition polymers, i.e., homopolymers and copolymers of polyacrylates, polyalkylacylates such as poly(methyl methacrylate), polystyrene, poly(α-methyl styrene), poly(acrylic acid), and poly(vinyl butyral), poly(vinyl acetate), poly(vinyl alcohol), poly(vinyl chloride), poly(acrylonitrile) and poly(vinylidene chloride); condensation polymers including polyesters such as poly(ethylene terephthalate), polycarbonates, polyamides, polyurethanes and polyimides; and modified cellulose derivatives including cellulose acetate, cellulose triacetate, cellulose acetate butyrate, cellulose butyrate, cellulose propionate, hydroxypropylcellulose, and carboxymethylcellulose and their blends. Specific polymers preferred in compositions of the invention are those with high optical transparency and glass transitions above100° C., for instance polycarbonate, poly(methyl methacrylate) and general class of polyimides.

Preferably, the organic polymer is an optically clear polymerized material prepared from a polycarbonate resin, such as the carbonate-linked resin derived from bisphenol A and phosgene, which is sold under the trademark, LEXAN. A most preferred organic polymer is the polycarbonate of the structure:

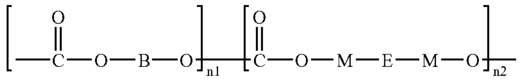

wherein B is:

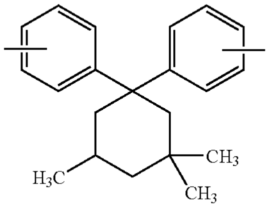

M is:

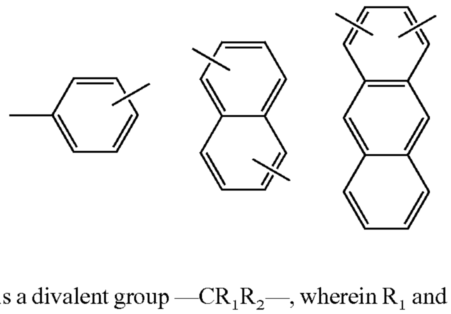

and E is a divalent group —$CR_1R_2$—, wherein $R_1$ and $R_2$ are the same or different and selected from the group: H, alkyl, arylalkyl, and spirofluorenyl; and n1+n2 is about 100 to about 1000. Such a material, wherein M is 1,4-phenylene and $R_1$ and $R_2$ are methyl, is a preferred polymer for the invention and is commercially available from Aldrich Chemical Co.

By "photochromic dye" we mean any organic material that, upon activation by exposure to ultraviolet radiation in the 250-400 nm range, generates a colored species with an extinction coefficient greater than 2,000. Preferably the activated dye has an extinction coefficient greater than 10,000 and a minimum solubility in common organic solvents of at least 0.5 wt %. Dyes preferred in the composition and process of the invention vary widely in structure and mechanism of action and include the viologen family, structure I:

I

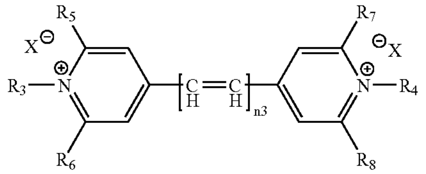

and the pyridinium salt family, structure II:

II

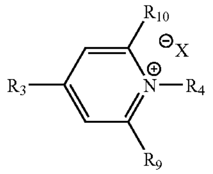

wherein $R_3$ and $R_4$ are the same or different and are selected from the group: $C_1$-$C_{18}$ alkyl, aryl, arylalkyl, alkylaryl, and alkylarylalkyl groups; $R_5$, $R_6$, $R_7$ and $R_8$ are the same or different and are selected from the group: hydrogen, $C_1$-$C_{18}$ alkyl, aryl, arylalkyl, alkylaryl, and alkylarylalkyl groups; $R_9$ and $R_{10}$ are the same or different and are selected from the group: $C_1$-$C_{18}$ alkyl, aryl, arylalkyl, alkylaryl, and alkylarylalkyl groups; each of $R_5$-$R_{10}$ may be interrupted or uninterrupted by one oxygen, each of $R_3$, $R_4$, $R_5$, $R_6$, $R_7$, $R_8$, $R_9$ and $R_{10}$ may be substituted or unsubstituted by one or two moieties selected from the group HO—, R'O—, Cl, Br, F, —CN, —$NO_2$, and R'$SO_3$—, wherein R'is selected from the group of $C_1$-$C_{10}$ straight chain and branched chain, alicyclic, aryl, and alkylaryl hydrocarbons; $X^-$ is selected from the group: $Cl^-$, $Br^-$, $BF_4^-$, $PF_6^-$, $ClO_4^-$, $CH_3C_6H_4SO_3^-$ and $CF_3SO_3^-$; and n3 is an integer between 0-3.

Other preferred photochromic dyes are those that exhibit photochromic properties as a result of reversible cleavage of carbon-hetero atom sigma bonds within the dye. Preferred dye families exhibiting this property include spiro(indoline) naphthoxazines, spiro(indoline)naphthioazine, spiro(indoline)benzoxazines and spiro(indoline)benzthioazine. The most preferred photochromic dyes useful in the invention are selected from the group of the spiroindoline structures III and IIIa:

III

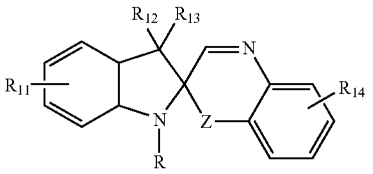

IIIa

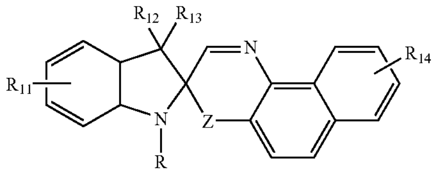

wherein R is selected from the group of $C_1$-$C_{10}$ straight chain and branched chain hydrocarbon; $R_{11}$ is selected from the group: hydrogen, $C_1$-$C_{18}$ alkyl, aryl, arylalkyl, alkylaryl, and alkylarylalkyl groups; $R_{12}$ and $R_{13}$ are the same or different and are selected from the group: hydrogen, $C_1$-$C_{18}$ alkyl, aryl, arylalkyl, alkylaryl, and alkylarylalkyl, spirofluorenyl-groups; $R_{14}$ is selected from the group: hydrogen, $C_1$-$C_{18}$ alkyl, aryl, arylalkyl, alkylaryl, alkylarylalkyl, benzo-, naptho-, and phenanthro-groups; Z is sulfur or oxygen; and each of $R_{11}$ $R_{12}$, $R_{13}$ and $R_{14}$ may be interrupted or uninterrupted by one oxygen, and substituted or unsubstituted by one or two moieties selected from the group HO—, R'O—, Cl, Br, F, —CN, —$NO_2$, and R'$SO_3$—, wherein R' is selected from the group of $C_1$-$C_{10}$ straight chain and branched chain, alicyclic, aryl, and alkylaryl hydrocarbons.

Other preferred photochromic dyes useful in the invention are selected from the group of the spiropyran and benzopyran structures IV and V:

IV

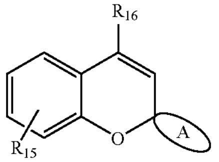

V

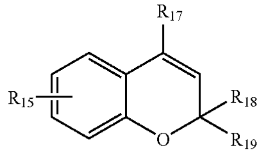

wherein A is selected from the group spiroadamantyl, spirocyclohexyl, spirocyclopentyl and spirofluorenyl groups, $R_{15}$ and $R_{16}$ may be the same or different and are selected from the group: hydrogen, $C_1$-$C_{18}$ alkyl, aryl, benzo, arylalkyl, alkylaryl, and alkylarylalkyl groups; $R_{17}$ is selected from the group: hydrogen, $C_1$-$C_{18}$ alkyl, aryl, arylalkyl, alkylaryl, and alkylarylalkyl groups; $R_{18}$ and $R_{19}$ may be the same or different and are selected from the group: $C_1$-$C_{18}$ alkyl, aryl, arylalkyl, alkylaryl, and alkylarylalkyl groups; wherein $R_{15}$ may be interrupted or uninterrupted by one oxygen, and $R_{15}$, $R_{16}$, $R_{17}$, $R_{18}$ and $R_{19}$ may be substituted or unsubstituted by one or two moieties selected from the group HO—, R'O—, Cl, Br, F, —CN, —$NO_2$, and R'$SO_3$—, wherein R'is selected from the group of $C_1$-$C_{10}$ straight chain and branched chain, alicyclic, aryl, and alkylaryl hydrocarbons.

The synthesis of a wide variety of photochromic dyes have been described in the scientific literature and patents and many materials are commercially available. For instance, several of the preferred spiroindoline dyes are available from Aldrich Chemical Co. under the Photorome brand name. U.S. Pat. No. 5,405,958, Van Gemert, hereby incorporated by reference, and references cited therein, describe the synthesis of several substituted spiro(indoline) naphthoxazines. The review by Dürr and Bouas-Laurent (cited above) discuss the synthesis of spiropyrans and spirooxazines in chapters 8 and 10, respectively.

By "photosensitizer" we mean an organic material that absorbs light in the range of 250 nm to about 600 nm and allows transfer of energy to the photochromic dye. General classes of photosensitizers useful in the invention are aliphatic and aromatic ketones, diaryl ketones, anthraquinones, benzoquinones, naphthoquinones, chloranils and mixtures thereof. Specific photosensitizers useful in the invention are chloranil, tetranitrofluorenone, 2,4,7-trinitrofluorenone, 2,7-dinitrofluorenone, diphenylketone, anthraquinone, fluorenone, benzoquinone, 4,4'-bis(dimethylamino)benzophenone (Michler's ketone), naphthoquinone, benzopyrone, polyvinylpyrrolidone, acetone, and N-methylpyrrolidone. Preferred photosensitizers to practice the invention include benzophenone and 4,4'-bis(dimethylamino)benzophenone.

By "electron acceptor" we mean electron deficient aromatic compounds that have an inherent capacity to accept electrons. General classes of electron acceptors useful in the invention include pyridinium salts, viologens, arylpyrilium salts, nitro and dinitro aromatic compounds, cyano and polycyano aromatic compounds and mixtures thereof. Specific preferred electron acceptors include, phenylnitrile, phenylenedinitrile(s), 2,4-dinitrofluorobenzene, tetracyanobenzene, and 9-dicyanomethylene-2,4,7-fluorene and most preferred is 1,4-phenylenedinitrile. Preferably the electron acceptor is present in about 0.1 to about 1 part by weight based on the weight of the photochromic dye.

In other embodiments of the invention the photochromic composition is in the form of a film on a substrate or a free-standing film. These solid plastic films may be prepared by blending an organic polymer, a photochromic dye, a photosensitizer, and an electron acceptor in an organic solvent to provide a homogeneous gel mixture followed by coating the gel on a substrate to provide a wet film. Preferably the wet gel composition comprises about 2 to 20 wt % organic polymer, about 0.2 to 5 wt % photochromic dye(s), about 0.2 to about 5 wt % photosensitizer and about 0.1 to about 5 wt % of electron acceptor. The wet film may be cured to remove the organic solvent to provide a solid plastic photohromic film. The film may remain on the substrate or be removed from the substrate.

Organic solvents may be of a wide variety so long as all four components are solubilized to give a homogeneous gel. Preferred solvents include dichloromethane, chloroform, 1,2-dichloroethane, toluene, benzene, xylene, tetrahydrofuran, dioxane, N-methylpyrrolidone, N,N-dimethylformamide, y-butyrolactone, acetonitrile, propylenecarbonate, diethylcarbonate, dimethylacetamide, dimethylsulfoxide, and 1,2-dimethoxyethane, and mixtures thereof.

Coating of the homogeneous gel mixture can be produced any conventional coating techniques including spray, evaporative; bar coating, extrusion die coating, knife over roll, reverse roll, curtain coating, blade coating and gravure coating of a continuous web of the substrate. The coated substrate may be cured in any conventional manner, for instance, by contact with warm air while passing through a drying chamber. A preferred method of curing comprises drying the film in a vacuum oven at a temperature of 80° C. to about 100° C. A cured film coated on a web can be wound on a take-up roll and later cut to desired sheet sizes. The total thickness of the dried photochromic composition on the substrate; whether coated as one or in layers is preferably in the range from about 0.1 to about 20 mil and most preferably is in the range from about 1 to 10 mil.

Substrates useful for coating the gel include glass, steel, ceramic and plastic substrates including poly(ethylene terephthalate) (PET), ACLAR®, polyethylene, polypropylene, polyacrylates, and poly(vinyl butyral).

The photochromic composition of the invention may be useful as a film on any surface, including building windows, automobile windows, sunroofs, windshields, or any surface that would benefit from variable transparency in direct sunlight. The composition of the invention may also have application in photochromic ophthalmic plastic lenses. There are several optical performance requirements of such a film including transparency, high optical density when activated, rapid increase in coloration, and rapid decrease in coloration (fading) upon termination of activation. There are also stability requirements of such a film including stability toward ultraviolet light, heat stability, scratch resistance, and in some applications impact resistance. As will be understood from the Examples and the data set forth below, the composition of the invention, addresses all the requirements necessary for a variable transparency optical coating.

The following Examples are meant to illustrate the invention and are not meant to limit the scope of the invention

EXAMPLE 1

The following example illustrate the formation of a photochromic film of the invention.

A mixture of poly[Bisphenol A carbonate-4,4'-(3,3,5-trimethylcyclohexylidene)-diphenolcarbonate] (10 parts, Aldrich Chemical Co. Cat. # 43,058-7), 1,3-Dihydro-1,3,3-trimethylspiro[2H-indole-2,3'-(3H)naphtha[2,1-b](1,4)oxazine] (1.5 parts), 5-Chloro-1,3-dihydro-1,3,3-trimethyl-spiro[2H-indole-2,3'-(3H)naphtha[2,1-b](1,4)oxazine](1.5 parts), benzophenone (photosensitizer, 3.0 parts), and 1,4-phenylenedinitrile (electron acceptor, 1.0 parts) was stirred with a mixture of chloroform and N-methylpyrrolidone (9:1 v/v, 83 parts) to give a homogeneous gel. The gel so prepared was slightly blue-purple and transparent.

A wet film of the gel was cast on a pre-cleaned window glass plate (8"×10") using an automatic applicator and a casting knife. The gap between the knife and the glass plate was adjusted so as to maintain a thickness of 2 mils. The wet film was then cured under vacuum at 80° C. for 2 h. After the curing period, the hot glass plate was allowed to cool down to ambient conditions and the film removed from the substrate after soaking for 2-3 min in D.I water.

EXAMPLE 2 (COMPARATIVE)

A photochromic film comprising polymer, photochromic dyes, and photosensitizer was prepared identical to Example 1 but with no 1,4-phenylenedinitrile (electron acceptor).

Figure 2:
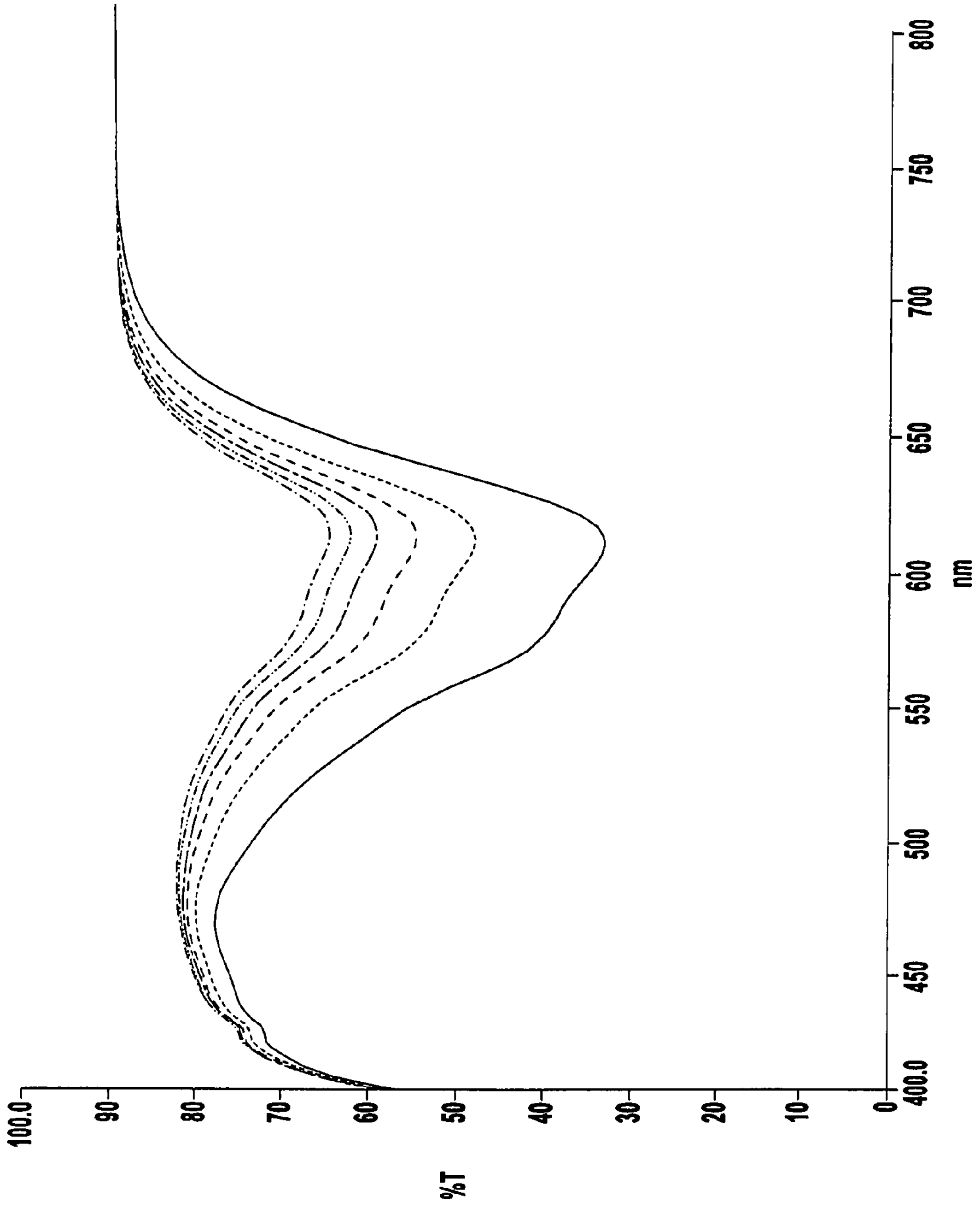
FIG. 2 shows the changes in the visible spectra of the photochromic system without the electron acceptor over 4 minute intervals of time in the fading cycle.

Table 1 and Table 2 show the fade characteristics of a typical solid photochromic films corresponding to the % light transmittance at wavelength of $\lambda_{max}$=609 nm when scanned at four minutes time intervals after it is fully activated under UV radiation (365 nm; 3000 μm/$cm^2$) to the blue colored state. As seen in the data, when fully darkened, the transmittance (t=0) drops to about 20% for Example 1 and about 33% for the comparative Example 2 without the electron acceptor. In the absence of UV light, the reverse process (i.e., fading) occurs. When measured at various intervals of time, the transmittance of both films increase in the absence of UV radiation. FIG. 1 shows a graph of % transmittance recovery (Δ/TD) versus time using the values from the data presented in Table 1 and Table 2. FIG. 1 shows that the transmittance recovery for Example 1, containing the electron acceptor, continues to increase over time whereas in Example 2, without electron acceptor, the transmittance plateaus and does not fully recover. FIG. 2 shows the changes in the visible spectra of the photochromic system of Example 2 during the fade cycle at 4 minute intervals. A large residual absorption after 20 minutes fading time is evident that corresponds to about 65% transmittance.

TABLE 1

Fade characteristics of the photochromic film measured at $\lambda_{max}$ = 609 nm.

| TIME [Min] [t] | % Light Transmittance Of activated Film [TD] | % Light Fade Transmittance [$TF_t$] | TD-$TF_t$ [Δ] | % Recovery [Δ/TD] |
|---|---|---|---|---|
| 0 | 20.078 | — | — | — |
| 4 | — | 25.337 | 5.259 | 26.19 |
| 8 | — | 39.200 | 19.122 | 95.24 |
| 12 | — | 46.402 | 26.324 | 131.10 |
| 16 | — | 50.613 | 30.535 | 152.08 |
| 20 | — | 52.565 | 32.487 | 161.18 |
| 24 | — | 53.621 | 33.543 | 167.06 |
| 28 | — | 66.518 | 46.440 | 231.39 |
| 32 | — | 69.534 | 49.456 | 246.32 |
| 36 | — | 72.527 | 52.449 | 261.22 |

TABLE 2

Fade characteristics of the photochromic film from Example 2 measured at $\lambda_{max}$ = 609 nm. (comparative)

| Time [Min] | % UV Transmittance Of Activated Film [TD] | % UV Fade Transmittance [$T_F$] | TD-$T_F$ [Δ] | % Recovery Δ/TD × 100 |
|---|---|---|---|---|
| 0 | 33.344 | — | — | — |
| 4 | | 48.012 | 14.668 | 43.99 |
| 8 | | 54.906 | 21.562 | 64.67 |
| 12 | | 59.271 | 25.927 | 77.76 |
| 16 | | 62.442 | 29.098 | 87.27 |
| 20 | | 63.560 | 30.216 | 90.62 |
| 24 | | 64.708 | 31.364 | 94.06 |
| 28 | | 64.710 | 31.366 | 94.06 |
| 32 | | 64.719 | 31.375 | 94.09 |
| 36 | | 64.720 | 31.376 | 94.09 |

What is claimed is:

1. A photochromic composition for controlling the transmission of light comprising: an organic polymer, a photochromic dye, a photosensitizer, and an electron acceptor selected from the group consisting of: phenylnitrile, one or more phenylenedinitriles, 2,4-dinitrofluorobenzene, tetracyanobenzene and 9-dicyanomethylene-2,4,7-fluorene.

2. A photochromic composition for controlling the transmission of light comprising: an organic polymer, a photochromic dye, a photosensitizer, and an electron acceptor consisting essentially of 1,4-phenylenedinitrile.

* * * * *